US006490369B1

United States Patent
Beiman

(10) Patent No.: US 6,490,369 B1
(45) Date of Patent: Dec. 3, 2002

(54) METHOD OF VIEWING AND IDENTIFYING A PART FOR A ROBOT MANIPULATOR

(75) Inventor: Leonard H. Beiman, Waterford, MI (US)

(73) Assignee: Fanuc Robotics North America, Rochester Hills, MI (US)

( * ) Notice: Subject to any disclaimer, the term of this patent is extended or adjusted under 35 U.S.C. 154(b) by 0 days.

(21) Appl. No.: 09/348,194

(22) Filed: Jul. 6, 1999

(51) Int. Cl.$^7$ .................................................. G06K 9/00
(52) U.S. Cl. ........................ 382/153; 382/151; 382/209; 382/217; 382/286
(58) Field of Search ................................. 382/153, 151, 382/154, 199, 209, 217, 289, 286, 294

(56) References Cited

U.S. PATENT DOCUMENTS

| | | |
|---|---|---|
| 4,731,860 A | 3/1988 | Wahl |
| 5,177,563 A | 1/1993 | Everett et al. |
| 5,463,697 A | 10/1995 | Toda et al. |
| 5,491,759 A | 2/1996 | Nagao et al. |
| 5,499,306 A * | 3/1996 | Sasaki et al. ............... 382/153 |
| 5,579,444 A | 11/1996 | Dalziel et al. |
| 5,651,075 A | 7/1997 | Frazier et al. |
| 5,946,425 A * | 8/1999 | Bove et al. .................. 382/128 |
| 6,064,749 A * | 5/2000 | Hirota et al. ................... 345/7 |

OTHER PUBLICATIONS

Vision–based object registration for real–time image overlay (1995), author M. Uenohara and T.Kanade the robotics institute, Carnegie Mellon University).*

* cited by examiner

Primary Examiner—Phuoc Tran
Assistant Examiner—Ali Bayat
(74) Attorney, Agent, or Firm—Howard & Howard

(57) ABSTRACT

A robot manipulator having a vision system for viewing and identifying a known part. The vision system includes a computer and a camera with known viewing geometry and optics to view the part. The method of viewing and identifying the part comprises the following steps. First, a template of the known part is stored in the computer. Secondly, the relative position of the camera in relation to the part is determined and stored. Thirdly, the part is viewed through the camera and a distorted image of the part is captured. Fourthly, the stored relative position information of the camera in relation to the part and the known viewing geometry and optics of the camera are used to convert the distorted image into a true image of the part which removes any distortions from the distorted image. Fifthly, the true edges of the true image of the part are determined. Lastly, the true edges of the part are compared to the template to allow the computer to identify the part such that the robot may accurately perform a desired operation on the part.

24 Claims, 5 Drawing Sheets

FIG - 3
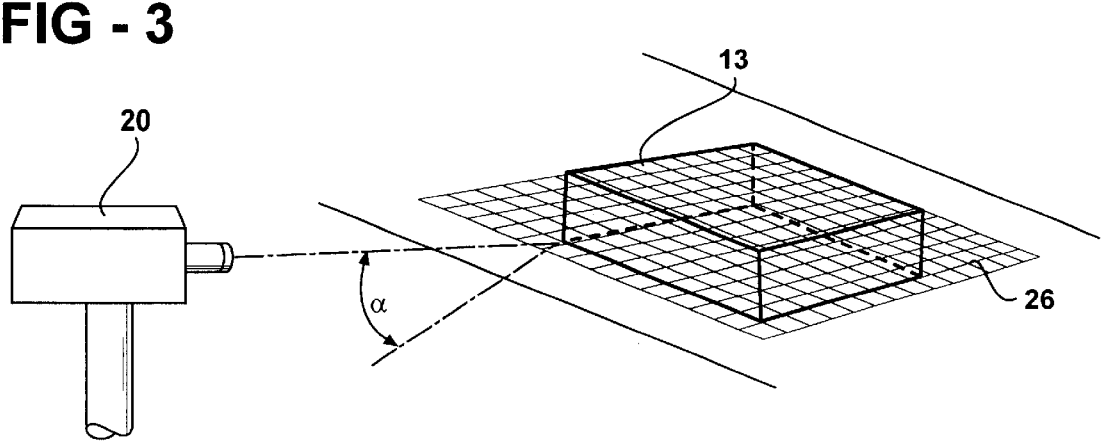
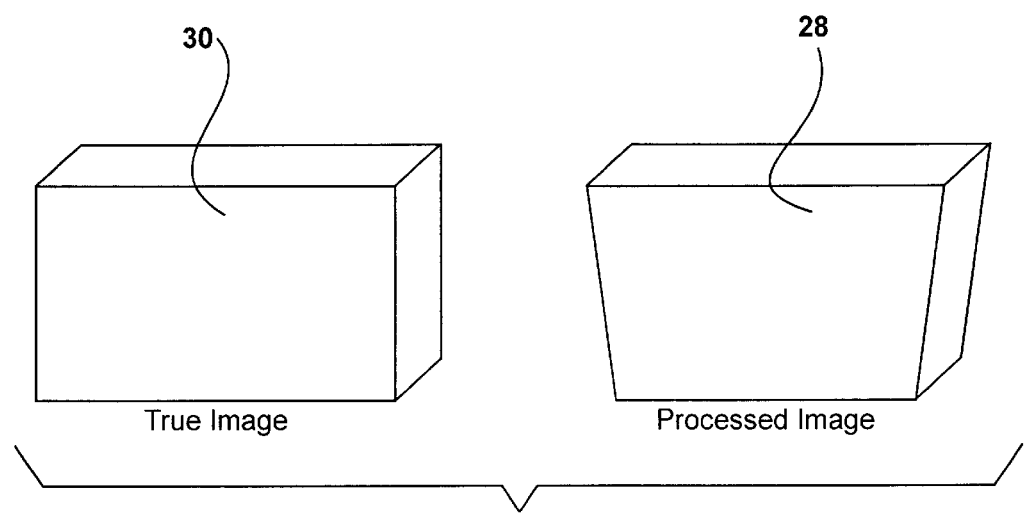
True Image     Processed Image
FIG - 4
FIG - 7
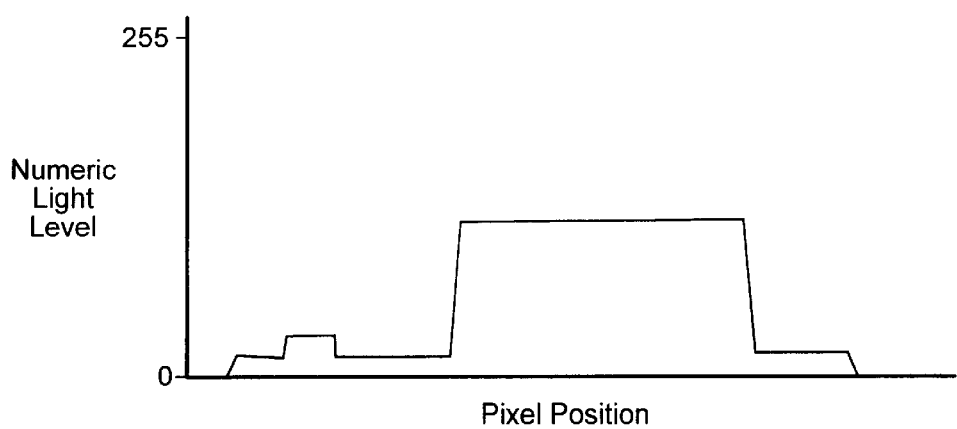

METHOD OF VIEWING AND IDENTIFYING A PART FOR A ROBOT MANIPULATOR

BACKGROUND OF THE INVENTION

1) Technical Field

The subject invention relates to a robot manipulator having a vision system for viewing and identifying a part.

2) Description of the Prior Art

Robot manipulators are well known in the art and are frequently used in many industrial applications. Vision systems are utilized on certain types of robots for assisting the robot in recognizing a location and orientation of a part and identifying the shape of the part. These vision systems typically include a camera and a computer. The identification is typically accomplished by comparing the image of the part with an image on a stored template. Once the part is matched with the template, the relative location, orientation, and size of the part can then be determined. After the location and identification of the part are known, the robot may proceed with a preprogrammed operation, such as gripping and moving the part.

The identification and location of a part and its profile and/or features can be a difficult process. Prior art systems do not take into account the effects of image distortion and perspective variation when the part shifts and/or rotates on a viewing surface. In other words, a camera can skew and distort the image of the part, especially when the part rotates into different orientations. Many prior art systems use a template comparison based on gray scale normalized correlation to determine the location of the part.

Gray scale normalized correlation is a process which takes each pixel or point of a template and compares it with each pixel or point of the actual part being viewed. Using gray scale normalized correlation, however, is computationally expensive and sometimes computationally prohibitive. Gray scale normalized correlation is even more expensive in a situation where the orientation of the object can change. For example, if a 64×64 image is compared to a 16×16 template, then at least 1 million pixel comparing operations would have to be performed to compare the image to the template. This operation is expensive and can take an appreciable amount of time to perform.

Accordingly, there is a need for a vision system which can operate on a distorted image of the part to provide identification and location information without using computationally expensive algorithms.

SUMMARY OF THE INVENTION AND ADVANTAGES

A method of viewing and identifying a known part for a robot manipulator using a vision system having a computer and a camera with known viewing geometry and optics to view the part. The method comprises the steps of: storing a template of the known part in the computer with identification parameters to identify the part; determining the relative position of the camera in relation to the part; storing the relative position information of the camera in relation to the part; viewing the part through the camera and creating a distorted image of the part resulting from the relative position of the camera and the viewing geometry and optics of the camera; using the stored relative position information of the camera in relation to the part and the known viewing geometry and optics of the camera to convert the distorted image into a true image of the part which removes any distortions from the distorted image; determining the true parameters of the true image of the part; and comparing the true parameters of the true image of the part to the identification parameters of the stored template to allow the computer to identify the part such that the robot may accurately perform a desired operation on the part.

Accordingly, the subject invention provides a vision system which eliminates any distortions and perspective effects from an imaged picture of the part before the picture of the part is compared to the template. By removing the distortions before performing the remaining calculations, the true image of the part is determined and identified by a relatively inexpensive means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of a camera disposed relative to a grid and a sample part;

FIG. 4 is a perspective view of a true image of the part and a distorted image of the part;

FIG. 7 is a graph depicting the numeric light levels as they relate to their corresponding pixel or point location;

DETAILED DESCRIPTION OF THE PREFERRED EMBODIMENT

Figure 1:
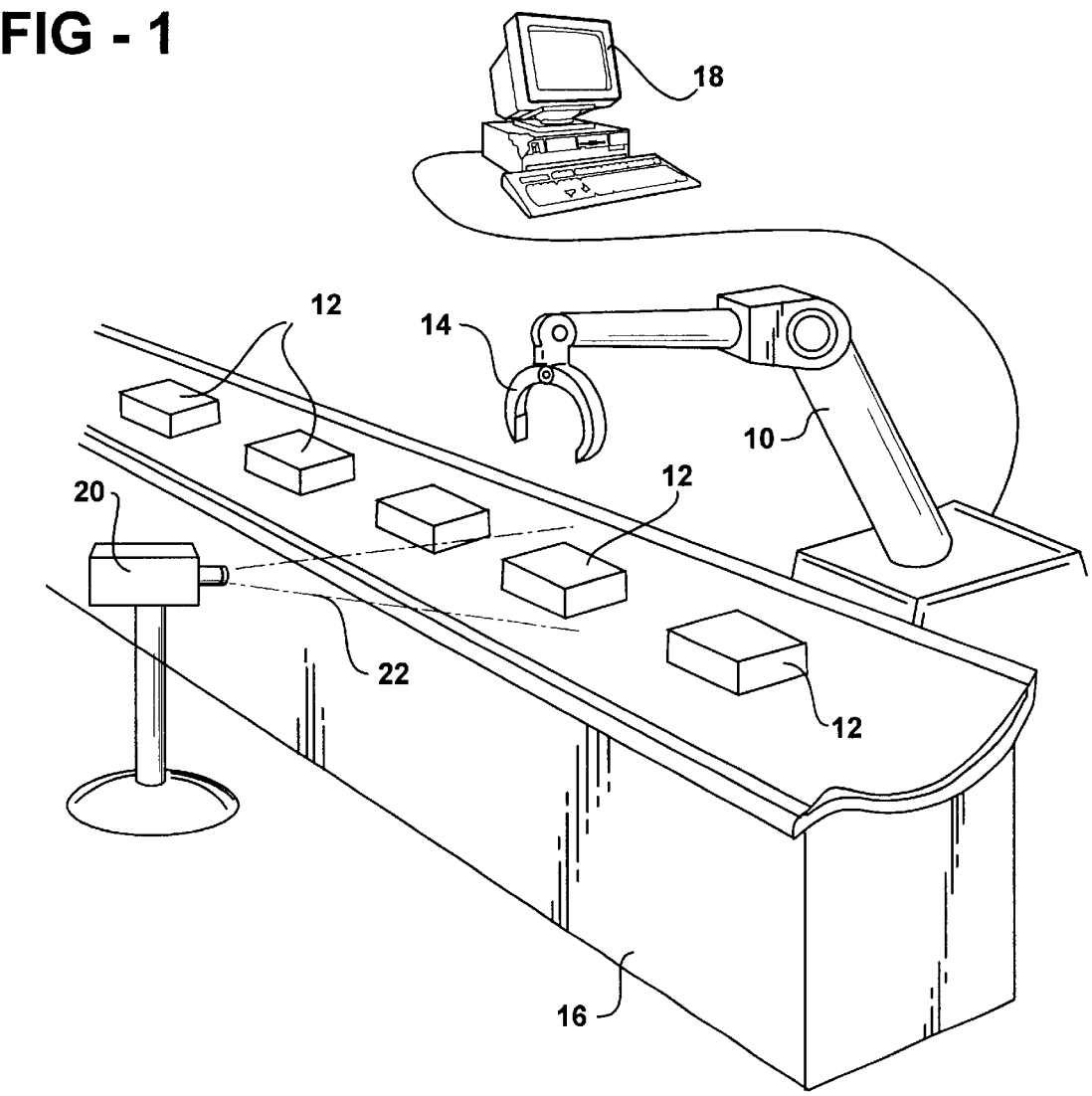
FIG. 1 is a perspective view of a vision system and a robot manipulator for performing a desired operation on a part.

Referring to the Figures, wherein like numerals indicate like or corresponding parts throughout the several views, a robot manipulator 10 having a vision system for viewing and identifying a part 12 is shown in FIG. 1. For illustrative purposes, the robot 10 depicted in the Figure has a gripper 14 for gripping and moving the part 12. As appreciated, the robot 10 may be of any suitable design, type or configuration without deviating from the scope of the subject invention. The parts 12 are positioned along a bench or conveyor type mechanism 16. The parts 12 are illustrated as rectangular shaped boxes 12. As also appreciated, the type, shape, configuration, size or any other characteristic of the part 12 is irrelevant to the scope of the subject invention. The vision system includes a computer, shown schematically at 18, and a camera 20 with known viewing geometry and optics to view the part 12. Typical viewing geometry and optics can include the lens type, focal length and camera type. The camera 20 has a field of view 22 which completely encompasses one part 12 at a time. The camera 20 and computer 18 may be of any design as is well known in the art. As discussed in the background section, the robot manipulator 10 and vision system shown in FIG. 1 are generally known in the art. The key to the subject invention relates to how the vision system can view and identify the part 12 such that the robot 10 may perform a desired operation on the part 12.

Figure 2:
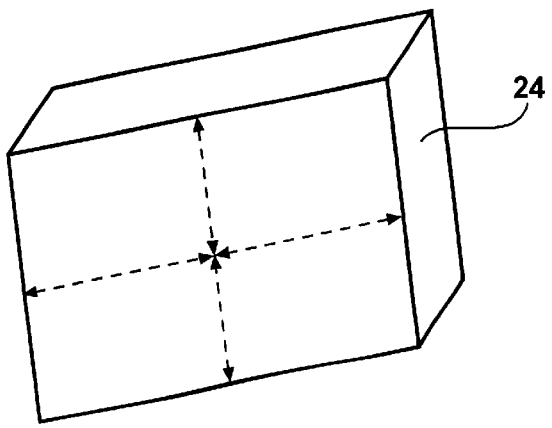
FIG. 2 is a perspective view of a template of the part.
Figure 8:
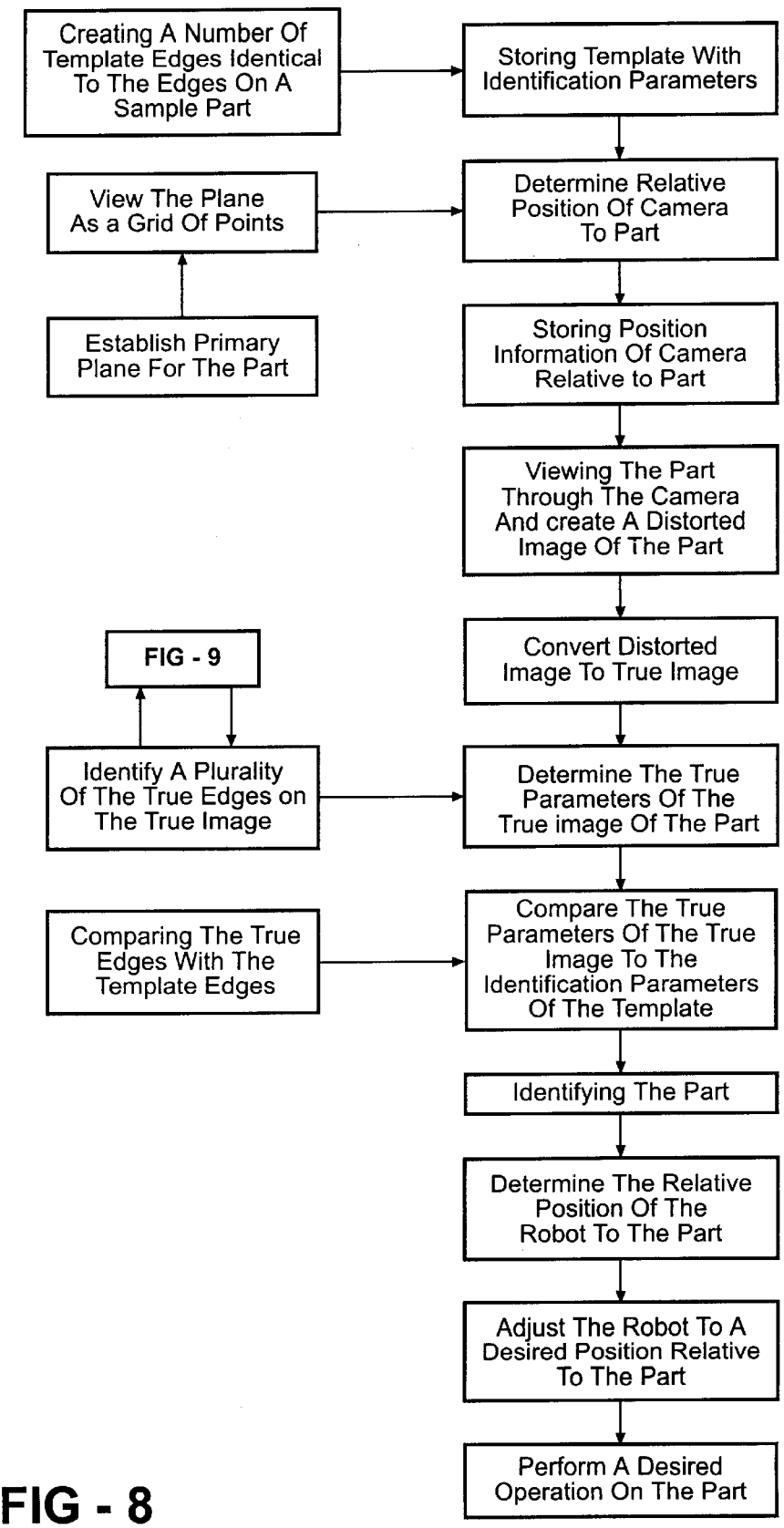
FIG. 8 is a block diagram outlining the method by which the part is identified.
Figure 9:
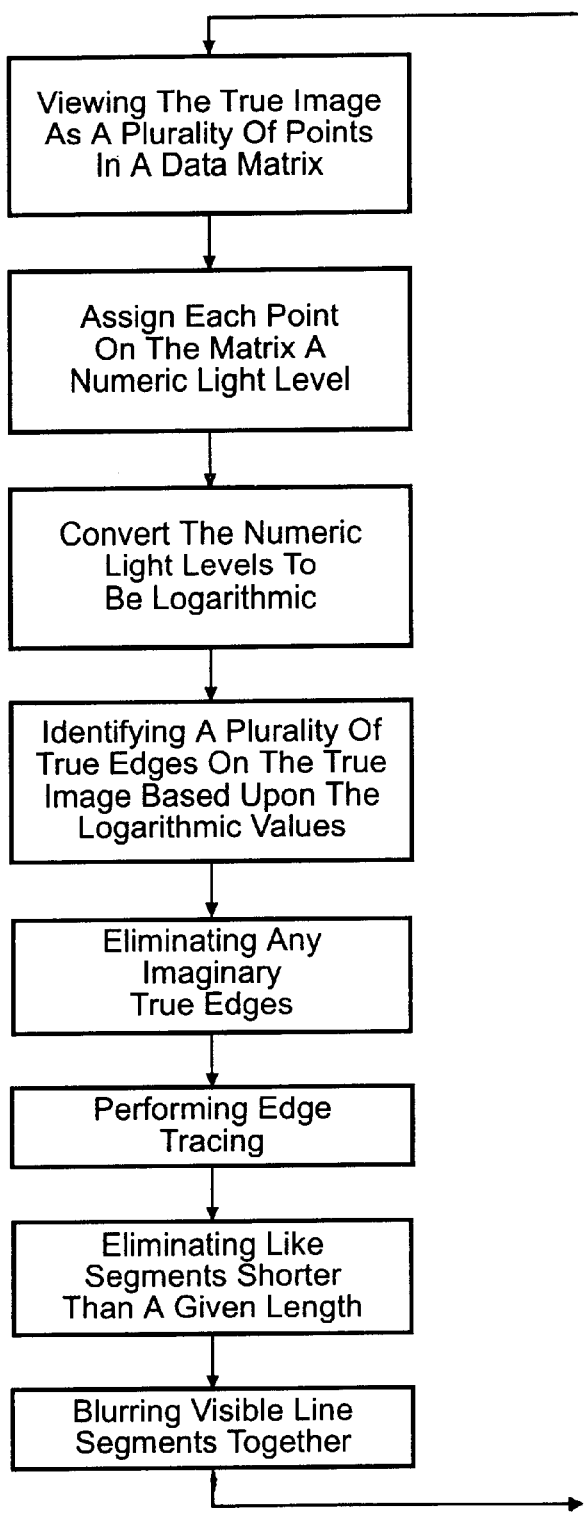
FIG. 9 is a block diagram further defining a particular step of the block diagram of FIG. 8.

The method of viewing and identifying the known part 12 comprises the following steps which are also identified in the block diagrams of FIGS. 8 and 9. First, a template 24 of the known part 12 is stored in the computer 18 with identification parameters to identify the part 12. Specifically, with reference to FIGS. 2 and 3, the template 24 is defined by a number of template edges which are created from and are identical to a sample part 13. The storing of the identification parameters for the template and the creation of the template edges is preferably accomplished by determining the orientation of a plurality of edges on the sample part 13 and determining a distance between the edges and a center of the sample part 13 to create the template edges identical to the sample part 13. This is sometimes known as determining the shift distance of the sample part 13 and template 24. As appreciated, distortions may occur when viewing the sample part 13. These distortions must be removed before an accurate template 24 may be created. The distortions are removed from an image of the sample part 13 by a conversion process known as edge correlation which is discussed in greater detail hereinbelow with reference to converting a distorted image of the part 12. Generally, the conversion process converts the captured image of the sample part 13 to a true image with no optical or perspective distortion. Once the distortion is removed, the desired identification parameters can be extracted.

Alternatively, the storing of the identification parameters for the template 24 and creation of the template edges may be accomplished by loading the orientation of the plurality of edges on the sample part 13 and the distance between the edges and the center of the sample part 13 from a suitable database to create the number of template edges identical to the sample part 13. As appreciated, there are no distortions present when loading an image from a suitable database. Hence, no conversion process is necessary and the identification parameters for the template can be extracted directly. In summary, the storing of the identification parameters and creation of the template edges may be accomplished by either viewing the sample part 13 or loading the desired information from a database such as CAD.

As appreciated, the template 24 depicted exactly matches the part 12 and sample part 13 shown in FIGS. 1,3 and 4. The template 24 does not need to be the exact size as the parts 12, 13 but must have the same overall configuration. In other words, the shift distances between the center and sides of the template 24 must have the same relative ratios as the shift distances on the parts 12, 13. As appreciated, the number of shift distances will depend upon the number of sides. There may be any number of templates stored within the computer 18 relating to any number of different corresponding parts. If there are multiple templates, the computer 18 compares the viewed part to each of the templates to find the appropriate match.

Secondly, the relative position of the camera 20 in relation to the part 12 is determined. With reference to FIG. 3, the determining of the relative position of the camera 20 in relation to the part 12 is further defined as establishing a primary plane of the sample part 13. More specifically, the primary plane of the sample part 13 is further defined by viewing the plane as a grid of points 26 or calibration pattern and determining the relative position of the camera in relation to the grid 26. The grid 26 is positioned in the location of the sample part 13 although during the calculations the sample part 13 is not present. In other words, the grid 26 is only used during the setup of the vision system in order to determine the relative position information of the camera 20 in relation to where the part 12 will be. Once, the distance of the camera 20 from the part 12 is known, the angle α can then be determined. Angle α is the relative angle between the camera's lens and the grid 26. The relative angle between the field of view 22 and the grid 26 (or where the sample part 13 will be) can now be determined. The relative position information of the camera 20 in relation to the part 12 is then stored.

As appreciated, the grid 26 as viewed by the camera 20 is distorted. The distortions are similar to the distortions that occur to the template 24 discussed above and the part 12 discussed below. Alternatively, the relative position of the camera 20 to the grid 26 may be determined by converting the distorted image of the grid 26 into a true image of the grid 26. This is accomplished by taking each point or pixel of the grid 26 and determining the relative adjustment necessary to create a true image of the grid 26. This type of process is known in the art as un-warping.

Thirdly, the part 12 is viewed through the camera 20 and a distorted image 28 of the part 12 is created which results from the relative position of the camera 20 and the viewing geometry and optics of the camera 20. In other words, a distorted image of the part 12 is captured by the camera. Referring to FIG. 4, the distorted image 28 can be greatly skewed (as shown). The distortions typically occur when the part 12 is rotated differently from a predetermined orientation. In other words, if the part 12 is in perfect alignment on the bench 16, distortions may not occur. As appreciated, it is very difficult if not impossible to have perfect alignment each and every time the part 12 is viewed. Therefore, in a real life setting, undesired orientations of the part 12 will frequently occur such that distortions of the part 12 will also frequently occur. As discussed above, the distortions of the part 12 are similar to the distortions that occur in the template 24 and grid 26 images. As is now discussed, the distortions in the image of the part 12 can be corrected. It is to be understood that the distortions in the image of the template 24 can also be corrected in a like fashion.

Fourthly, the stored relative position information of the camera 20 in relation to the part 12 and the known viewing geometry and optics of the camera 20 are used to convert the distorted image 28 into a true image 30 of the part 12 which removes any distortions from the distorted image 28. The true image 30 of the part 12 is also shown in FIG. 4. This step removes the unwanted distortions before the majority of the computational steps are performed. Hence, the computer 18 can recognize the part 12 irrespective of the relative orientation of the part 12 and a complex and expensive correlation program does not have to be performed.

Fifthly, the true parameters of the true image 30 of the part 12 are determined. Specifically, the true parameters of the true image 30 of the part 12 are further defined as identifying a plurality of true edges on the true image 30. The determining of the true edges is known generally in the art as edge correlation. There are a number of additional computational steps which are performed to determine the true parameters (i.e., true edges) of the true image 30 which are discussed in greater detail below.

Lastly, the true parameters of the true image 30 of the part 12 are compared to the identification parameters stored in the template 24 to allow the computer 18 to identify the part 12 such that the robot 10 may accurately perform the desired operation on the part 12. Specifically, the comparing is further defined as comparing the true edges with the template edges. In other words, the shift distances of the true image 30 (distances between the center and edges of the true image 30) are compared to the shift distances of the template 24.

Referring also to FIGS. 5 through 7 and 9, the additional computational steps which are performed to determine the true parameters of the true image 30 (the edge correlation) are now discussed. For illustrative purposes, the part 12 shown in FIGS. 5 and 6 has an irregular configuration to highlight some of the identification steps. The identifying of the plurality of true edges on the true image is further defined by viewing the true image as a plurality of points or pixels in a data matrix 32 or data array. The data matrix 32 is specifically shown in FIGS. 5 and 6. The data matrix 32 is the image that the camera 20 sees when viewing the part 12. Hence, the original data matrix 32 seen by the camera is distorted which correlates to the distortion of the part 12. The following steps are designed to remove this distortion to create the true image of the part 12 and correct the distorted data matrix 32.

Figures 5, 6:
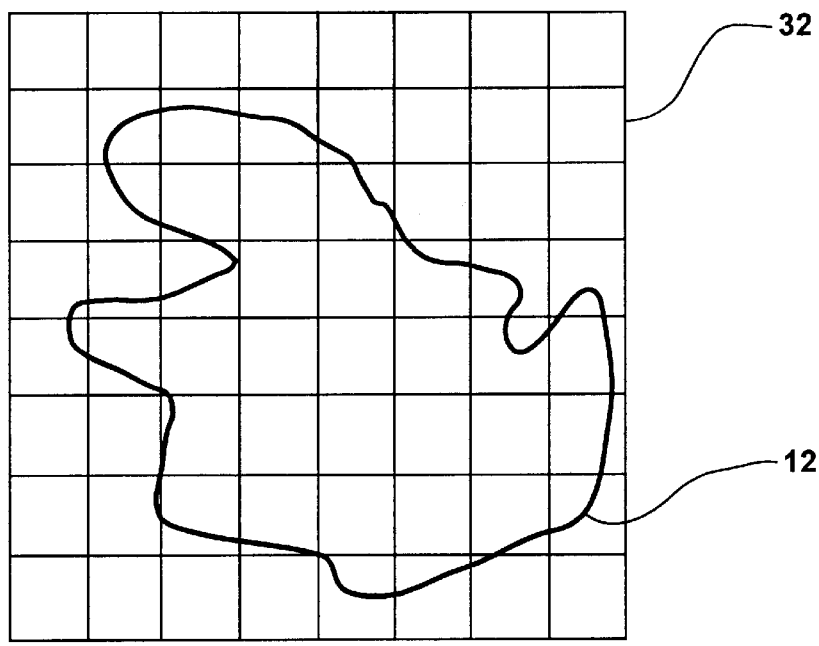
FIG. 5 is a view of a part as seen through the camera which places the part into a data matrix.
FIG. 6 is the matrix filled with numeric light levels.

Each point or pixel of the matrix 32 is assigned a numeric light level which is based upon the relative brightness of the point. The relative brightness of each point is determined by a sensor (not shown). The numeric light levels range from zero (0) to two hundred fifty five (255) with zero being completely dark and 255 being the brightest. The numeric light levels are actually created by a contrast between the relative brightness of the part 12 and the relative brightness of the background. For a dark colored part 12, which is illustrated in FIGS. 5 and 6, the brightness or contrast is relatively small and the numeric light levels will typically range from zero (0) to fifteen (15). For a lighter part 12 the brightness or contrast is larger and the numeric light levels will typically range from one hundred fifty (150) to two hundred fifty (250).

The numeric light levels of each point are then converted to be logarithmic. This will help reduce undesirable light level variations. Referring to FIG. 7, the numeric light levels can be graphed against each point or pixel location. The identifying of the plurality of true edges on the true image 30 is now based upon the logarithmic value of each point. In other words, flat portions on the graph illustrate light levels that are at a relatively constant value which should identify an edge of the part 12. A convolution operator, which is a 3×3 operator, may be used to find the magnitude and orientation of the edges on the true image 30.

The next step is to eliminate any imaginary true edges on the true image 30 by performing a second derivative calculation. In other words, a second derivative convolution is performed to eliminate edges that are not at zero crossings. An edge tracing is then performed to connect the remaining true edges on the true image 30 to establish line segments for the true image 30. Line segments shorter than a predetermined length are eliminated which defines usable line segments for the true image 30. The usable line segments are blurred together by performing a smoothing operation which identifies actual true edges on the true image 30. Now that the actual true edges are determined, the true edges may be compared to the template edges such that the computer 18 can make a match and identify the part 12. This final step is known in the art as the edge correlation.

To illustrate the computational time savings of the subject invention, the following is an example using a 64×64 true image with a 16×16 template. Assume the 64×64 true image has 1,000 true edges and the 16×16 template has 200 template edges. To compare the true image to the template, 200,000 pixel comparing operations would have to be performed. Because the distortions are removed, the true edges can be determined and compared to the template edges as opposed to comparing each and every pixel or point location. This reduces the number of comparing operations by at least five times from the prior art systems discussed above.

Additional steps which may be helpful in performing the desired operation include determining the relative position of the robot 10 to the part 12 and adjusting the robot 10 to align the robot 10 in a desired position relative to the part 12 before performing the desired operation on the part 12.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of viewing and identifying a known part for a robot manipulator using a vision system having a computer and a camera with known viewing geometry and optics to view the part, the method comprises the steps of:

storing a template of the known part in the computer with identification parameters that correlate to an image of the part without any distortions such that there is only one template for each known part;

determining a relative position of the camera in relation to the part;

storing the relative position information of the in relation to the part;

viewing the part through the camera which creates a distorted image of the part resulting from the relative position of the camera to the part, the viewing geometry of the camera, and the optics of the camera;

using the stored relative position information of the camera in relation to the part and the known viewing geometry and optics of the camera to convert the distorted image into a true image of the part which removes any distortions from the distorted image;

determining the true parameters of the true image of the part viewed by the camera; and comparing the true parameters of the true image of the part to the identification parameters of the stored template to allow the computer to identify the part such that the robot may accurately perform a desired operation on the part.

2. A method as set forth in claim 1 wherein storing the identification parameters for the template is further defined by determining the orientation of a plurality of edges on a sample part and determining a distance between the edges and a center of the sample part to create a number of template edges identical to the sample part.

3. A method as set forth in claim 1 wherein storing the identification parameters for the template is further defined by loading the orientation of a plurality of edges on a sample part and the distance between the edges and the center of the sample part from a suitable database to create a number of template edges identical to the sample part.

4. A method as set forth in claim 1 wherein determining the relative position of the camera in relation to the part is further defined as establishing a primary plane for the part.

5. A method as set forth in claim 4 wherein establishing the primary plane for the part is further defined by viewing the plane as a grid of points and determining the relative position of the camera in relation to the grid.

6. A method as set forth in claim 1 wherein determining the true parameters of the true image of the part is further defined as identifying a plurality of true edges on the true image.

7. A method as set forth in claim 6 wherein identifying the plurality of true edges on the true image if further defined by viewing the true image as a plurality of points in a data matrix.

8. A method as set forth in claim 7 wherein identifying the plurality of true edges on the true image is further defined by assigning each point of the matrix a numeric light level which is based upon the relative brightness of the point.

9. A method as set forth in claim 8 further including converting the numeric light levels of each point to be logarithmic.

10. A method as set forth in claim 9 wherein identifying the plurality of true edges on the true image is based upon the logarithmic value of each point.

11. A method as set forth in claim 10 further including eliminating any imaginary true edges on the true image by performing a second derivative calculation.

12. A method as set forth in claim 11 further including performing edge tracing to connect the remaining true edges on the true image to establish line segments for the true image.

13. A method as set forth in claim 12 further including eliminating line segments shorter than a predetermined length to define usable line segments for the true image.

14. A method as set forth in claim 13 further including blurring the usable line segments together by performing a smoothing operation which identifies actual true edges on the true image such that the true edges may be compared to the template edges.

15. A method as set forth in claim 1 further including determining the relative position of the robot to the part.

16. A method as set forth in claim 15 further including adjusting the robot to align the robot in a desired position relative to the part before performing the desired operation on the part.

17. A method of viewing and identifying a known part for a robot manipulator using a vision system having a computer and a camera with known viewing geometry and optics to view the part, the method comprises the steps of:

storing a template of the known part in the computer with identification parameters which are defined as a plurality of edges on the part and a distance between the edges and a center of the part with the identification parameters being used to create a number of template edges identical to the part to identify the part;

determining a relative position of the camera in relation to the part;

storing the determined relative position information of the camera in relation to the part;

viewing the part through the camera which creates a distorted image of the part resulting from the relative position of the camera to the part, the viewing geometry of the camera, and the optics of the camera;

using the stored relative position information of the camera in relation to the part and the known viewing geometry and optics of the camera to convert the distorted image into a true image of the part which removes any distortions from the distorted image;

determining the true parameters of the true image of the part; and comparing the true parameters of the true image of the part to the identification parameters of the stored template to allow the computer to identify the part such that the robot may accurately perform a desired operation on the part.

18. A method as set forth in claim 17 wherein storing the identification parameters for the template is further defined by determining the orientation of a plurality of edges on a sample part and determining a distance between the edges and a center of the sample part to create a number of template edges identical to the sample part.

19. A method as set forth in claim 17 wherein storing the identification parameters for the template is further defined by loading the orientation of a plurality of edges on a sample part and the distance between the edges and the center of the sample part from a suitable database to create a number of template edges identical to the sample part.

20. A method as set forth in claim 17 wherein determining the true parameters of the true image of the part is further defined as identifying a plurality of true edges on the true image, and the comparing is further defined as comparing the true edges with the template edges.

21. A method as set forth in claim 20 wherein identifying the plurality of true edges on the true image if further defined by viewing the true image as a plurality of points in a data matrix.

22. A method as set forth in claim 21 wherein identifying the plurality of true edges on the true image is further defined by assigning each point of the matrix a numeric light level which is based upon the relative brightness of the point.

23. A method as set forth in claim 17 further including determining the relative position of the robot to the part.

24. A method as set forth in claim 23 further including adjusting the robot to align the robot in a desired position relative to the part before performing the desired operation on the part.

* * * * *